United States Patent
Alderson et al.

(10) Patent No.: US 6,878,320 B1
(45) Date of Patent: Apr. 12, 2005

(54) AUXETIC MATERIALS

(75) Inventors: Kim Lesley Alderson, Liverpool (GB); Virginia Ruth Simkins, Lancashire (GB)

(73) Assignee: The University of Bolton, higher education corporation a UK corporation, Bolton (GB)

( * ) Notice: Subject to any disclaimer, the term of this patent is extended or adjusted under 35 U.S.C. 154(b) by 0 days.

(21) Appl. No.: 09/936,069

(22) PCT Filed: Mar. 6, 2000

(86) PCT No.: PCT/GB00/00814

§ 371 (c)(1),
(2), (4) Date: Jan. 29, 2002

(87) PCT Pub. No.: WO00/53830

PCT Pub. Date: Sep. 14, 2000

(30) Foreign Application Priority Data

Mar. 6, 1999 (GB) .............................. 9905145

(51) Int. Cl.[7] .............................................. B29C 67/00
(52) U.S. Cl. ..................... 264/125; 264/126; 264/127
(58) Field of Search .............................. 264/125, 126, 264/127

(56) References Cited

U.S. PATENT DOCUMENTS

| 4,187,390 A | 2/1980 | Gore | 174/102 |
|---|---|---|---|
| 4,668,557 A | 5/1987 | Lakes | 428/131 |

FOREIGN PATENT DOCUMENTS

| EP | 0 253 513 A | 1/1988 |
|---|---|---|
| WO | WO 91/01210 | 2/1991 |

OTHER PUBLICATIONS

"Complete Textile Glossary" Celanese Acetate; 2001.*
Nkansah, M.A. et al: "Modeling the Effects of Negative Poisson's Ratio in Continuous–Fibre Composites" Journal of Materials Science, vol. 28, 1993, pp. 2687–2692.
Caddock B.D. et al: "Microporous Materials with Negative Poisson's ratios I. Microstructure and Mechanical Properties" Journal of Physics. D: Applied Physics, vol. 22, 1989, pp. 1877–1882.
Pickles, A.P. et al: "The Effect of Powder Morphology on the Processing of Auxetic Polypropylene (PP of Negative poisson's Ratio)" Polymer Engineering & Science, US, Society of Plastics Engineers, vol. 36, No. 5, Mar. 15, 1996, pp. 636–642.
Burke M: "A Stretch of the Imagination" New Scientist, GB, IPC Magazines, London, vol. 154, No. 2085, Jun. 7, 1997 pp. 36–39.

* cited by examiner

*Primary Examiner*—Elizabeth M. Cole
(74) *Attorney, Agent, or Firm*—Barlow, Josephs & Holmes, Ltd.

(57) ABSTRACT

An auxetic polymeric material is manufactured in a filamentary or fibrous form. The auxetic polymeric material has a negative Poisson ratio so that it has the property of expanding or contracting transversely to a direction in which it is extended or compressed. The process for forming the material involves cohering and extruding heated polymer powder so that the cohesion and extrusion is effected with spinning to produce auxetic filaments. Typically, the power is heated to a temperature sufficient to allow some degree of surface melting yet not high enough to enable bulk melting.

9 Claims, 1 Drawing Sheet

AUXETIC MATERIALS

This application is a 371 of PCT/GB00/00814, filed Mar. 6, 1999.

This invention relates to synthetic auxetic materials, that is, to polymeric materials having a negative Poisson ratio whereby, when stretched in one direction by application of a tensile load, the material expands transversely to that direction. Alternatively, when compressed in one direction, the material contracts transversely to that direction.

Synthetic auxetic materials have been known since 1987. In the first instance, and as described in U.S. Pat. No. 4,668,557, auxetic materials were prepared as open-celled polymeric foam, negative Poisson ratio properties being obtained as a consequence of mechanical deformation of the foam by compression.

More recently, auxetic materials have been formed as polymer gels, carbon fibre composite laminates, metallic foams, honeycombs and microporous polymers.

Published patent specification WO 91/01210 describes a polymeric material having an auxetic microstructure of fibrils interconnected at nodes. As described, this material is obtained by a process which comprises compacting polymer particles at elevated temperatures and pressures and then deforming the compacted polymer by draw-assisted extrusion through a die to produce a cylindrical rod of auxetic material.

A typical process may use a compaction stage with a specially designed processing rig heated to 110–125° C. with a blank die inserted. Polymer powder is added into a barrel of the rig and is allowed to come to temperature for between 3–10 minutes before compaction pressure is applied with a ram at a rate of up to 140 mm/min. The pressure is held at 0.04 GPa for 10–20 minutes and the resulting rod of compacted material is then removed from the barrel of the processing rig and allowed to air cool. The processing rig is then fitted with an extrusion die in place of the blank die and heated up to 160° C. The compacted rod is reinserted into the barrel and sintered at 160° C. for 20 minutes. It is then immediately extruded at a rate of 500 mm/min at 160° C. through a conical die of geometry entry diameter 15 mm, exit diameter 7–7.5 mm, cone semi-angle 30° and capillary length 3.4 mm.

The material obtained from this typical process has auxetic properties derived from the microstructure of the material, namely fibrils interconnected at nodes capable of transverse expansion and increased porosity when the material is stretched.

Auxetic materials are of interest as a consequence of predicted enhancement of mechanical properties such as plane strain fracture toughness and shear modulus. This enhancement has been demonstrated in practice in tests in terms of indentation resistance and ultrasound attenuation with blocks of auxetic microporous ultra high molecular weight polyethylene.

Enhancements in hardness of up to three times at low loads, and very large enhancements (again up to three times) in the attenuation coefficient (i.e. how much of an ultrasound signal is absorbed) are exhibited as between the auxetic material and conventional polyethylene.

Known auxetic materials have been made in the form of bodies with relatively low aspect ratios, and in the case of auxetic microporous polymers these have been made from powder using a three stage process involving compaction, sintering and ram extrusion through a conical die as described above.

Hitherto therefore auxetic materials have not successfully been made in the form of fibres (i.e. with high aspect ratios), despite the interest in such materials. Typically a fibre is an elongate body having a length at least 100 times its diameter.

An object of the present invention is to provide a viable process for the production of auxetic materials in fibre form.

According to one aspect of the invention therefore there is provided an auxetic polymeric material which is of filamentary or fibrous form.

According to a further aspect of the invention therefore there is provided a method of forming an auxetic material comprising cohering and extruding heated thermoformable particulate polymeric material wherein cohesion and extrusion is effected with spinning to produce filamentary material having auxetic properties.

With this arrangement, surprisingly the use of spinning with cohesion and extrusion provides an effective means of producing auxetic material in filamentary form. It has been found that this process can provide an auxetic microstructure of fibrils and nodes, as with the above mentioned prior art process, but without requiring the separate compaction and sintering stages of the prior art.

Most preferably the process of the invention is performed without, or substantially without, any separate compaction or sintering stages, compaction or rather cohesion and heating being effected solely as part of extrusion in the spinning process. Preferably also there is no (or substantially no) separate post-extrusion draw stage, finalisation of mechanical treatment being effected wholly or substantially wholly during extrusion rather than subsequently thereto.

The spinning process is preferably performed at a temperature which is high enough to give rise to cohesion of polymer particles sufficient to permit production of filaments, but without causing actual melting and complete coalescence of the particles into a liquid form. This temperature range is usually defined by reference to a typical DSC (Differential Scanning Calorimetry) diffusion endotherm and would fall on the low temperature side of that endotherm.

It is believed that for a fibre to be auxetic its maximum melting temperature and its DSC-derived % crystallinity should be as close as possible to those of the powder from which it has been derived. Thus, it is desirable that the auxetic fibres should comprise powder particles which have been sintered together at a temperature low enough to allow some degree of surface melting yet not high enough to enable bulk melting and hence reduction in crystallinity.

The particles are preferably small sized rough surfaced particles, particularly irregularly shaped and sized particles although varying within a defined size range, say up to 300 $\mu$m diameter+10%.

The process may be performed using standard melt extrusion apparatus having an extruder plate (spinneret) with say 40 holes each of 0.55 mm diameter.

The apparatus may have three zones, a barrel zone, an adapter zone and a die zone which are capable of independent temperature control. The barrel zone may itself have three zones (a feed, compression and metering zone) which may be capable of independent temperature control. However, a common temperature may be employed throughout.

Preferably screw extrusion rather than ram extrusion is used, operating at say 10 rpm.

Appropriate devices may be used for collecting and cooling produced filaments, preferably without applying any appreciable drawing traction thereto. Cooling may be achieved by air cooling, and/or passing the filaments around a cooling roller, or otherwise. Extruded hot filaments may run between a cooling roller and a nip roller, and an air knife may be provided at an appropriate height say 5 mm above the filaments. Further rollers may be provided for guiding the cooled filaments e.g. to a vertical drop and collection point. The rollers may be driven at a relatively low speed, say around 5 meters per minute, to avoid application of significant traction force.

The process may be applied to polypropylene in which case the temperature used may be say 159° C. Other polymeric materials, such as nylon or other polyolefin or polyamide materials may be used particularly polyethylene such as ultra high molecular weight polyethylene. The polymeric material may be mixed with or incorporate any other suitable materials such as fillers, other polymers, etc.

The process may be applied to the production of continuous monofilaments, or short filaments or fibres, and these may be twisted or otherwise combined to give multifilament or fibrous yarns.

These filamentary or fibrous materials may be formed into textile structures such as woven, knitted or felted fabrics alone or in combination with any other suitable materials.

Filaments or fibres made in accordance with the invention may be used as reinforcements in composite materials to impart enhanced energy absorption properties and fibre pullout resistance.

Textile structures incorporating or made from filaments or fibres made in accordance with the invention may be used in protective clothing where enhanced indentation properties and low velocity impact resistance are advantageous. Such textile structures may also be used in healthcare. There are also other applications where the material of the invention can be used advantageously.

The invention therefore also provides an auxetic material of filamentary or fibrous form, preferably formed by the process described above, and textile structures made with such auxetic material.

The invention will now be described further by way of example only and with reference to the accompanying drawings in which:

FIG. 1 shows conventional melt extrusion apparatus used in performing the process of the invention, by way of example.

Figure 1:
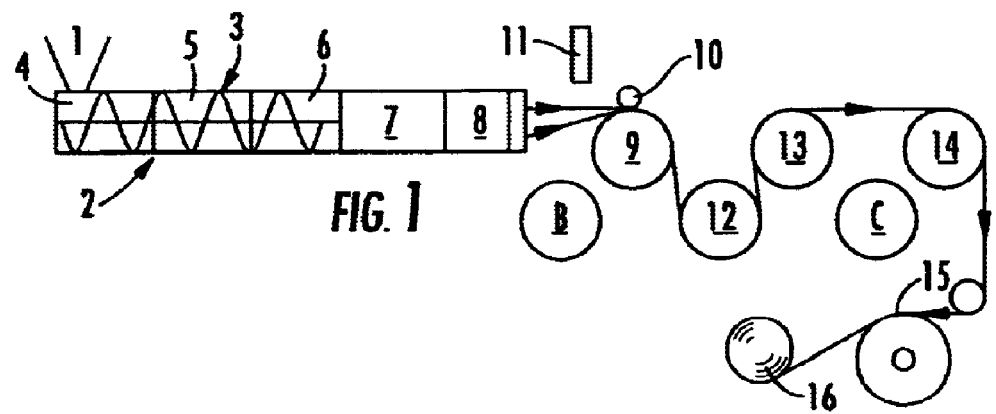
FIG. 1 is a diagrammatic representation of one form of apparatus used in performing the process of the invention.

The apparatus has a powder hopper 1 leading to a barrel 2 containing an Archimedean feed screw 3. The extruder barrel 2 has three zones feed, compression and metering zones 4, 5, 6. The screw 3 has a 3:1 compression ratio, a 1 inch (2.54 cm) diameter and a length-to-diameter ratio of 24:1.

The barrel 2 is connected via a diameter-reducing adapter section 7 to a die 8 comprising a 40-hole spinneret, the holes being of 0.55 mm diameter.

In front of the die there is a cooling roller 9 with a pinch roller 10 and an air knife 11, and subsequent guide rollers 12-14, a guide rail 15 and a wind-up roller 16.

A heater is provided (not shown) for heating the barrel 2 at the three separate zones 4, 5, 6 along its length, and also at adapter 7 and die 8.

The heating arrangement permits different temperatures to be maintained for each of these and conventionally this would be in an increasing manner from zone one 4 to zone three 6.

In use, for polypropylene powder, zone temperature differences might typically be from 10–20° C. In accordance with an example of the present invention a temperature of 159° C. is maintained throughout the three zones 4-6 of the barrel 2, adapter 7, and die 8, and polypropylene powder is fed from the hopper 1 to the barrel 2.

The polypropylene powder in this example has a particle diameter <300 $\mu$m, the diameters of individual particles varying within a range of ±10% of a medium diameter. All particles have irregular shapes and rough surfaces.

The polymer used is Coathylene PB 0580, as produced by Plast-Labor S.A., CH-1630 Bulle, Switzerland.

The screw 3 is driven at a controlled relatively slow rate of 10 rpm (corresponding to a throughput of 3.6 gms per minute) and this causes the powder to be advanced along the zones 4-6 of the barrel 2 to the adapter 7 and the die 8. This speed, is selected in relation to other parameters, namely the powder morphology, the temperature, the length of the barrel 2 and adapter 7, a nd the cross-sectional characteristics of the barrel 2, adapter 7 and holes of the die 8. The powder particles are thereby caused to cohere together and flow through the die holes.

The screw speed is selected to be as slow as possible, and the temperature is as low as possible, whilst achieving smooth fibre characteristics.

The temperature is below The melting point of the polymer so that the particles cohere to form a continuous, fluent body without losing their integrity. Thus, although the apparatus is derived from conventional melt extrusion apparatus, the process involves 'melt' or flow spinning, but without melt extrusion occurring.

In particular, and as discussed further below, the powder particles are sintered together at a temperature low enough to allow some degree of surface melting but not high enough to give bulk melting.

The material flows through the die 8 and is taken up by the pinch rollers 9, 10 without application of any appreciable traction. The material is therefore spun or extruded but not significantly drawn.

The 'molten' filaments leaving the die 8 are picked up with a metal rod and draped around the cooling roller 9 prior to engagement of the pinch roller 10. The pinch roller 10 is then engaged and the air knife moved in position at a setting of 5 mm above the path of the filaments.

From the pinch rollers 9, 10, the filaments are taken down from the cooling roller 10 and are passed under roller 12, up and over roller 13 and then straight across to roller 14. The filaments are then fed vertically downwards and slid over the guide rail 15 to the wind-up roller 16.

In this example the rollers 9, 10, 12-14, 16 are driven to run at a slow speed of 2 meters per minute to achieve guide of the filaments without applying any appreciable drawing or traction forces. However, at higher barrel extrusion speeds, proportionally higher roller speeds would enable the same fibre characteristics to be achieved. Other rollers such as would be used with apparatus of this kind where drawing is required are not used here.

Figure 2:
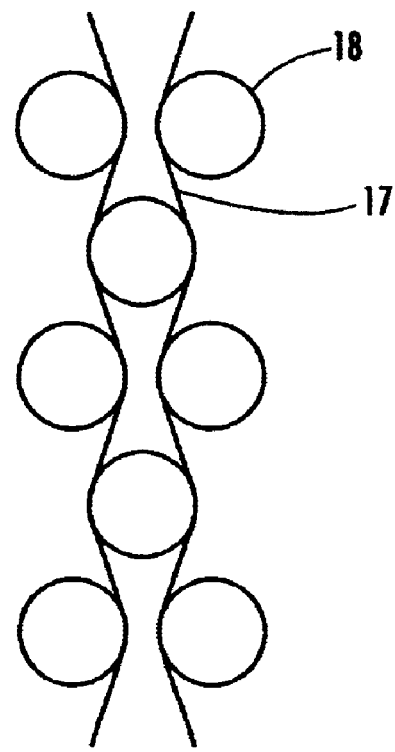
FIG. 2 is a diagrammatic representation of the structure of a fibre formed by the process of the invention.

As a consequence of the above described procedure the filamentary material produced from the die 5 has a microstructure of fibrils 17 linked by nodes 18, as shown in FIG. 2, which gives rise to auxetic properties.

This microstructure is known to provide auxetic properties but has hitherto been obtained by compaction and sintering of the polymer powder, which may be followed by draw extrusion of a relatively large diameter cylindrical rod (say up to 10 or 15 mm). It has been found, surprisingly, that the auxetic microstructure can be obtained with the above described 'melt' spinning process without use of separate compacting and sintering stages or paying careful attention to die geometry.

The following table, Table 1, gives detailed parameters for the above described example of the invention, in the column identified Batch M. These parameters are compared with parameters of two other batches, Batch B and Batch H using the same polypropylene powder. Also, characteristic parameters of a sample of raw powder are shown.

| Extrusion process parameters | Characteristic parameters (DSC) | Batch B | Batch H | Batch M | PP Powder |
|---|---|---|---|---|---|
| Temp Screw Feed Zone (4) - (° C.) | | 173 | 163 | 155 | |
| Temp Screw Compression Zone (5) - (° C.) | | 185 | 166 | 159 | |
| Temp Screw Metering Zone (6) - (° C.) | | 205 | 168 | 159 | |
| Temp Adaptor Zone (7) - (° C.) | | 212 | 165 | 158 | |
| Temp Die Zone (8) - (° C.) | | 210 | 168 | 158 | |
| RPM | | 25 | 30 | 10 | |
| MPM | | 5 | 6 | 2 | |
| | $T_{error}$ - (° C.) | 151 | 155 | 156 | 149 |
| | $T_{max}$ - (° C.) | 165 | 166 | 165 | 165 |
| | % crystallinity | 32.3 | 24.8 | 45.5 | 47.8 |

As can be seen from the table, the batch of raw powder examined starts to melt at 149° C. and melts completely at 165° C., and the % crystallinity of the powder is 47.8%. Parameters were derived using Differential Scanning Calorimetry conducted on a Polymer Labs PL DSC under flowing nitrogen at a heating rate of 10° C./min from 30–200° C. Batch M has somewhat similar characteristic parameters to the raw powder, particularly the crystallinity percentage.

Micrographic analysis of Batch M fibres showed that they had auxetic properties. That is, the fibres showed a structure of fibrils attached to modules. Also, extension of the fibres caused these to expand laterally.

Batch B and Batch H were processed at higher temperatures and higher throughputs. As shown in the table this resulted in a much reduced crystallinity percentage. Micrographic analysis did not reveal any significant auxetic properties.

This demonstrates that, to attain auxetic properties, it is desirable for the powder particles to be sintered together at a temperature low enough to allow some degree of surface melting yet not high enough to enable bulk melting whereby the fibres remain as close as possible to the raw powder particularly with regard to the DSC-derived % crystallinity.

The resulting filamentary auxetic material can be used as reinforcing fibres, or in textile structures, and has advantageous properties suited to a range of applications.

Some possible applications can be identified as follows.

Auxetic fibres can be used as fibre reinforcements in composite materials e.g. polyolefin auxetic fibres in a polyolefin matrix. The auxetic fibres improve resistance to fibre pull out and fibre fracture toughness, and give enhanced energy absorption properties. Sonic, ultrasonic and impact energy can be absorbed enabling superior composites to be made for sound insulation of walls of buildings, body parts for submarines or other vehicles, etc, bumpers for cars, etc. Auxetic materials also respond to impact to give local densification thereby giving enhanced indentation resilience.

Auxetic fibres can be used alone or in combination with other materials for personal protective clothing or equipment as a consequence of the superior energy absorption and impact resistance properties. Crash helmets and body armour (e.g. bullet proof vests) are examples of applications.

For such an application it may be desirable to make the protective material in the form of an auxetic macrostructure made from auxetic fibres (i.e. a hierarchical auxetic material). This would enable a single-component protective material to perform the combined energy absorption and indentation resistance roles, rather than having separate layers to perform each of these tasks in a dual-component material.

These properties should also lead to enhanced sports protective clothing, e.g. shin pads, knee pads, batting gloves etc. The possibility exists of producing protective clothing made from auxetic fibres which have equivalent protective performance to those made from non-auxetic fibres but which are lighter and/or thinner due to the benefits associated with the auxetic property.

Auxetic materials have pore size/shape and permeability variations leading to superior filtration/separation performance in several ways when compared to non-auxetic materials. Application of an applied tensile load on a non-auxetic porous material causes the pores to elongate in the direction of the applied load, which would tend to increase the filter porosity. However, the positive Poisson's ratio of non-auxetic materials causes the pores to contract in the transverse direction, thus reducing the overall porosity in competition with the increase in porosity due to longitudinal pore extension. For an auxetic porous material, on the other hand, the pores extend in both the loading and transverse directions, leading to enhanced porosity variations when compared with the non-auxetic equivalent. Benefits for auxetic filter materials, therefore, include release of entrapped particulates (leading to potential for cleanable filters and filters/membranes where a controlled release of a dose of particles/cells/molecules of a specific size/shape are required, e.g drug-release materials) and self-regulating filters to compensate for pressure build-up due to filter fouling.

Non-auxetic microporous polypropylene fibres have been proposed for use in cloth filters. Also, non-auxetic microporous fibres, possibly hollow, are themselves used as separation materials in which a two-phase mixture (solid and liquid, for example) is passed down the middle of the fibre, with one phase then passing through the walls of the fibre whilst the other continues to pass down the middle. Hollow polypropylene fibres are employed in, for example, mechanical lung applications in which carbon dioxide is removed from the blood of the patient, and fresh oxygen is supplied to the patient. An auxetic equivalent should have superior performance in terms of selectivity and cleanability in these applications.

Polypropylene fibres are employed in rope or cord and fishnet applications due to their high strength and low weight (i.e. floatation) properties. In addition to the usual methods of strengthening ropes (due to twisting mechanisms between fibres etc) the auxetic effect can further enhance the strength properties of ropes and fishnets.

In the case of two adjacent non-auxetic fibres, application of tension of the fibres causes them to elongate in the direction of tension and to contract radially due to the positive Poisson's ratio. Hence (neglecting twist and friction effects etc.) extension of the fibres is simply governed by the fibre Young's modulus. For two adjacent auxetic fibres, however, the elongation in the direction of applied tension is accompanied by a concomitant increase in radial expansion due to the negative Poisson's ratio. For two fibres in contact this causes radial compression between the fibres which is, therefore, converted into a longitudinal contraction (due to the negative Poisson's ratio) in direct competition to the extension due to the applied tensile load. Hence, in this case the overall longitudinal extension of the fibres is lower than that which would be expected from the fibre Young's modulus as a direct consequence of the auxetic effect. In other words, to a first approximation the extension of two or more non-auxetic fibres in radial contact will be equal to that of a single fibre of equal Young's modulus in isolation and subject to the same applied stress, whereas the extension of two or more auxetic-fibres in radial contact will be less than that of a single fibre of equal Young's modulus in isolation. Hence, a rope or fishnet made from auxetic fibres will have enhanced strength properties.

In addition to the strength enhancements, auxetic fibres also exhibit improved wear resistance due to having enhanced indentation properties. This leads to ropes and fishnets having enhanced abrasion properties to counteract the effects of ingress of, for example, sand grains during use. Improved wear resistance should also be useful in other fibre applications such as upholstery fabrics etc.

Naturally-occurring auxetic biomaterials are known, for example cow teat skin, cat skin and certain forms of bone. In developing synthetic replacement biomaterials it is desirable to consider auxetic functionality in order to ensure an adequate match in the mechanical properties of the real and synthetic materials. Currently, fibrous biomedical materials include cartilage, surgical implants and suture anchors or muscle/ligament anchors, where the additional benefit of a microporous structure should promote bone in-growth. The use of auxetic fibres leads to benefits by ensuring an adequate match in mechanical properties, improved strength and wear resistance for load bearing components (e.g. cartilage), and improved 'anchoring' properties.

Auxetic fibres can be used in bandages and pressure pads in woundcare. Important properties in these applications may include that the bandage maintains pressure on the wound to prevent swelling of the wound, and enables the wound to breathe through the macropores of the bandage structure whilst also preventing infection of the wound. Ideally the bandage may also enable wound-healing to occur by application of an appropriate wound-healing agent.

A tubular bandage or pad or strip formed from auxetic fibres can be applied around a limb. Auxetic fibres would tend to act to maintain the breathability and pressure applied by an auxetic bandage on the wound despite any swelling of the wound.

Furthermore, if the auxetic fibres are 'loaded' with a wound-healing component (i.e. the wound-healing component particles are initially entrapped within the auxetic fibre microstructure) then the extension in length and thickness of the fibres due to wound swelling would open up the fibre micropores, thus enabling release of the wound-healing component to counteract the initial swelling.

Other miscellaneous applications are:

fire-retardant (FR) fibres—due to incorporating FR component in pores of fibre by extending fibre during processing and then entrapping FR component by closing up pores due to release of extension after processing;

drug-delivery fibrous materials—similar to FR fibres where drug molecules/particulates are entrapped within fibres and subsequently released by extending fibres to open up pores;

other fibres which need to contain an additional component within the pores (e.g. dye molecules for dyeability);

composite fibres—in which one or more components are auxetic fibres (e.g. winding a dyeable fibre around an auxetic fibre in order to produce a fibre having benefits due to auxetic effect and also dyeability property);

fibrous seals—to exploit advantages due to auxetic property in seal and gasket applications.

It is of course to be understood that the invention is not intended to be restricted to the details of the above embodiment which are described by way of example only.

What is claimed is:

1. A method of forming an auxetic material comprising the steps of cohering and extruding a heated thermoformable particulate polymer material wherein cohesion and extrusion are effected during spinning to produce filamentary material having auxetic properties, and wherein there is substantially no compaction or sintering of the polymer material prior to spinning of the material.

2. The method according to claim 1 wherein said method is performed substantially without any separate post-extrusion draw stage.

3. The method according to claim 1 wherein said method is performed at a temperature which is high enough to give rise to cohesion of polymer particles sufficient to permit production of filaments but without cawing actual melting and complete coalescence of the particles into a liquid form.

4. The method according to claim 1 wherein said particulate polymer material comprises rough surfaced particles having irregular shape and size.

5. The method according to claim 4 wherein said particles are up to 300 $\mu$m in diameter.

6. The method according to claim 1 wherein said step of extruding is performed using melt extrusion apparatus having a barrel zone, an adapter zone and a die zone with an extruder plate, wherein said zones are capable of independent temperature control.

7. The method according to claim 6 wherein said barrel zone comprises a feed sub-zone, a compression sub-zone and a melting sub-zone, each of said sub-zones being capable of independent temperature control.

8. The method according to claim 6 wherein said barrel zone includes an extrusion screw.

9. The method of claim 6 wherein said extruded filaments from said die zone are passed around rollers substantially without drawing traction.

* * * * *